US012606169B2

(12) United States Patent
Oniwa et al.

(10) Patent No.: US 12,606,169 B2
(45) Date of Patent: Apr. 21, 2026

(54) VEHICLE CONTROL APPARATUS

(71) Applicant: HONDA MOTOR CO., LTD., Tokyo (JP)

(72) Inventors: Yoshihiro Oniwa, Saitama (JP); Daichi Kato, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 441 days.

(21) Appl. No.: 17/579,100

(22) Filed: Jan. 19, 2022

(65) Prior Publication Data

US 2022/0234586 A1 Jul. 28, 2022

(30) Foreign Application Priority Data

Jan. 22, 2021 (JP) ................................. 2021-009148

(51) Int. Cl.
B60W 30/18 (2012.01)
B60W 50/14 (2020.01)
(52) U.S. Cl.
CPC ...... B60W 30/18163 (2013.01); B60W 50/14 (2013.01); *B60W 2050/146* (2013.01); *B60W 2540/215* (2020.02); *B60W 2552/10* (2020.02); *B60W 2554/4041* (2020.02)
(58) Field of Classification Search
CPC ........... B60W 30/18163; B60W 50/14; B60W 2050/146; B60W 2540/215; B60W 2552/10; B60W 2554/4041; B60W 50/08; B60W 60/001; B60W 10/20; B60W 60/005
See application file for complete search history.

(56) References Cited

U.S. PATENT DOCUMENTS

| 2018/0178714 A1 | 6/2018 | Fujii | |
| 2018/0178716 A1* | 6/2018 | Shota | B60Q 1/346 |
| 2018/0327029 A1* | 11/2018 | Masao | B60Q 9/00 |
| 2019/0241198 A1* | 8/2019 | Toshiya | B60W 30/18 |

(Continued)

FOREIGN PATENT DOCUMENTS

| CN | 112208531 A | 1/2021 |
| JP | 2018-103767 A | 7/2018 |

(Continued)

OTHER PUBLICATIONS

Oct. 31, 2023, translation of Japanese Office Action issued for related JP Application No. 2023-001131.

(Continued)

*Primary Examiner* — Rachid Bendidi
*Assistant Examiner* — Kirsten Jade M Santos
(74) *Attorney, Agent, or Firm* — Paratus Law Group, PLLC

(57) ABSTRACT

A vehicle control apparatus includes a recognition unit configured to recognize an environment in a vicinity of a vehicle; and a traveling control unit configured to execute a lane change of the vehicle based on a recognition result 1w the recognition unit. The traveling control unit selectively executes a lane change of the vehicle based on proposal information of a lane change output to a driver of the vehicle by the traveling control unit and a lane change of the vehicle not based on the proposal information in response to a first operation of the same content by the driver.

11 Claims, 12 Drawing Sheets

(56)      References Cited

U.S. PATENT DOCUMENTS

| | | | |
|---|---|---|---|
| 2020/0239072 | A1 | 7/2020 | Hirosawa et al. |
| 2021/0009134 | A1 | 1/2021 | Horiba et al. |

FOREIGN PATENT DOCUMENTS

| | | | | |
|---|---|---|---|---|
| JP | 2018-108768 | A | 7/2018 | |
| JP | 2018-188020 | A | 11/2018 | |
| JP | 2020-117165 | A | 8/2020 | |
| JP | 2020-185929 | A | 11/2020 | |
| WO | WO-2020035897 | A1 * | 2/2020 | ............. B60K 37/02 |

OTHER PUBLICATIONS

Nov. 8, 2022, Japanese Office Action issued for related JP Application No. 2021-009148.
Apr. 30, 2025, translation of Chinese Office Action issued for related CN Application No. 202111680315.1.

\* cited by examiner

Figure 2:
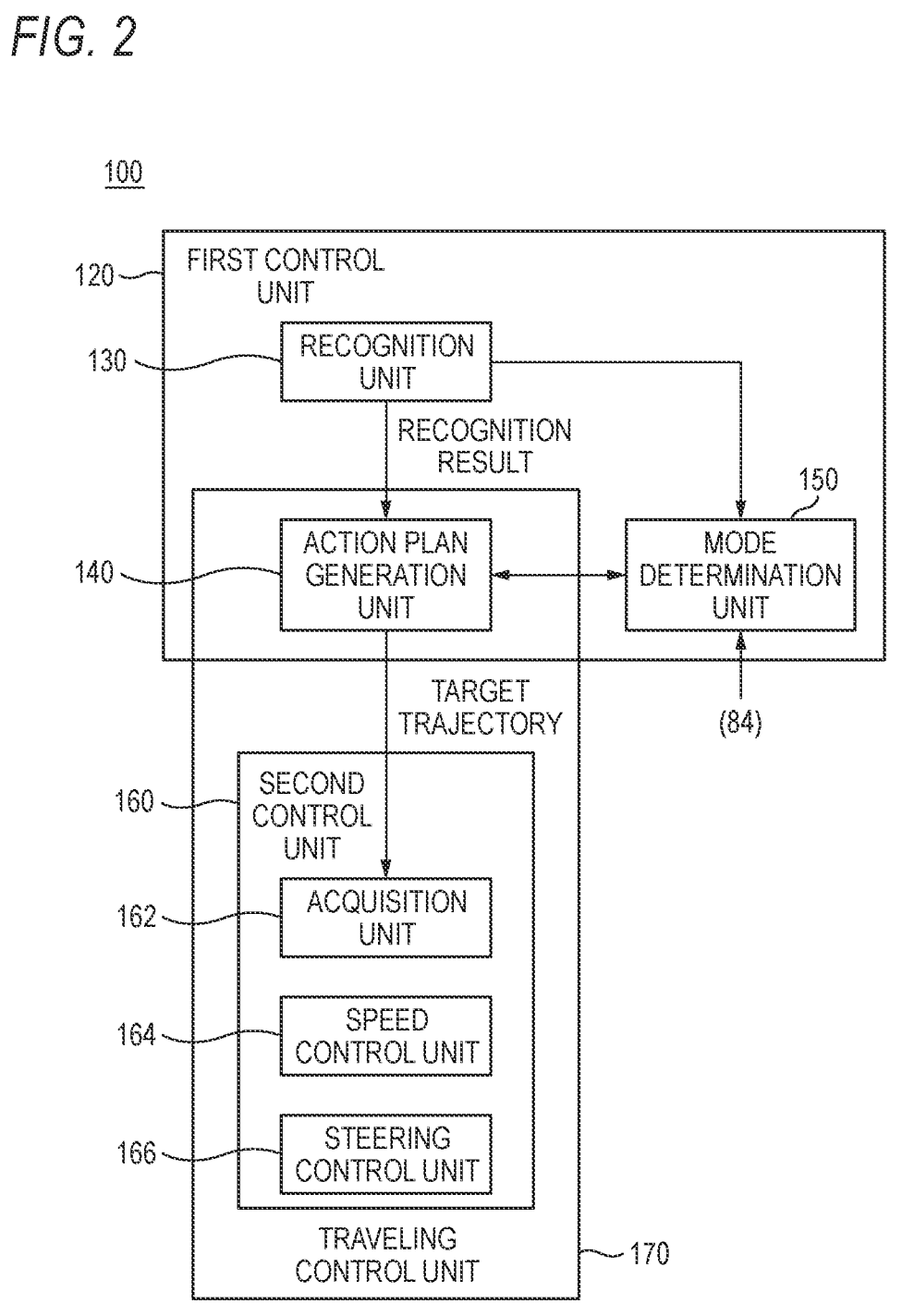

120 — FIRST CONTROL UNIT

130 — RECOGNITION UNIT

RECOGNITION RESULT

150

140 — ACTION PLAN GENERATION UNIT

MODE DETERMINATION UNIT

TARGET TRAJECTORY (84)

160 — SECOND CONTROL UNIT

162 — ACQUISITION UNIT

164 — SPEED CONTROL UNIT

166 — STEERING CONTROL UNIT

TRAVELING CONTROL UNIT — 170

*FIG. 3*

| DRIVING MODE | CONTROL STATE | TASK |
|---|---|---|
| FIRST DRIVING MODE | AUTOMATIC DRIVING | FRONT MONITORING: UNNECESSARY STEERING GRIP: UNNECESSARY |
| SECOND DRIVING MODE | DRIVING ASSISTANCE | FRONT MONITORING: NECESSARY STEERING GRIP: UNNECESSARY |
| THIRD DRIVING MODE | DRIVING ASSISTANCE | FRONT MONITORING: NECESSARY STEERING GRIP: NECESSARY |
| FOURTH DRIVING MODE | DRIVING ASSISTANCE | FRONT MONITORING: NECESSARY AT LEAST CERTAIN DEGREE OF DRIVING OPERATION IS NECESSARY |
| FIFTH DRIVING MODE | MANUAL DRIVING | FRONT MONITORING: NECESSARY DRIVING OPERATION IS NECESSARY FOR BOTH STEERING AND ACCELERATION AND DECELERATION |

TASK: LIGHT ⟷ TASK: HEAVY

*FIG. 5*

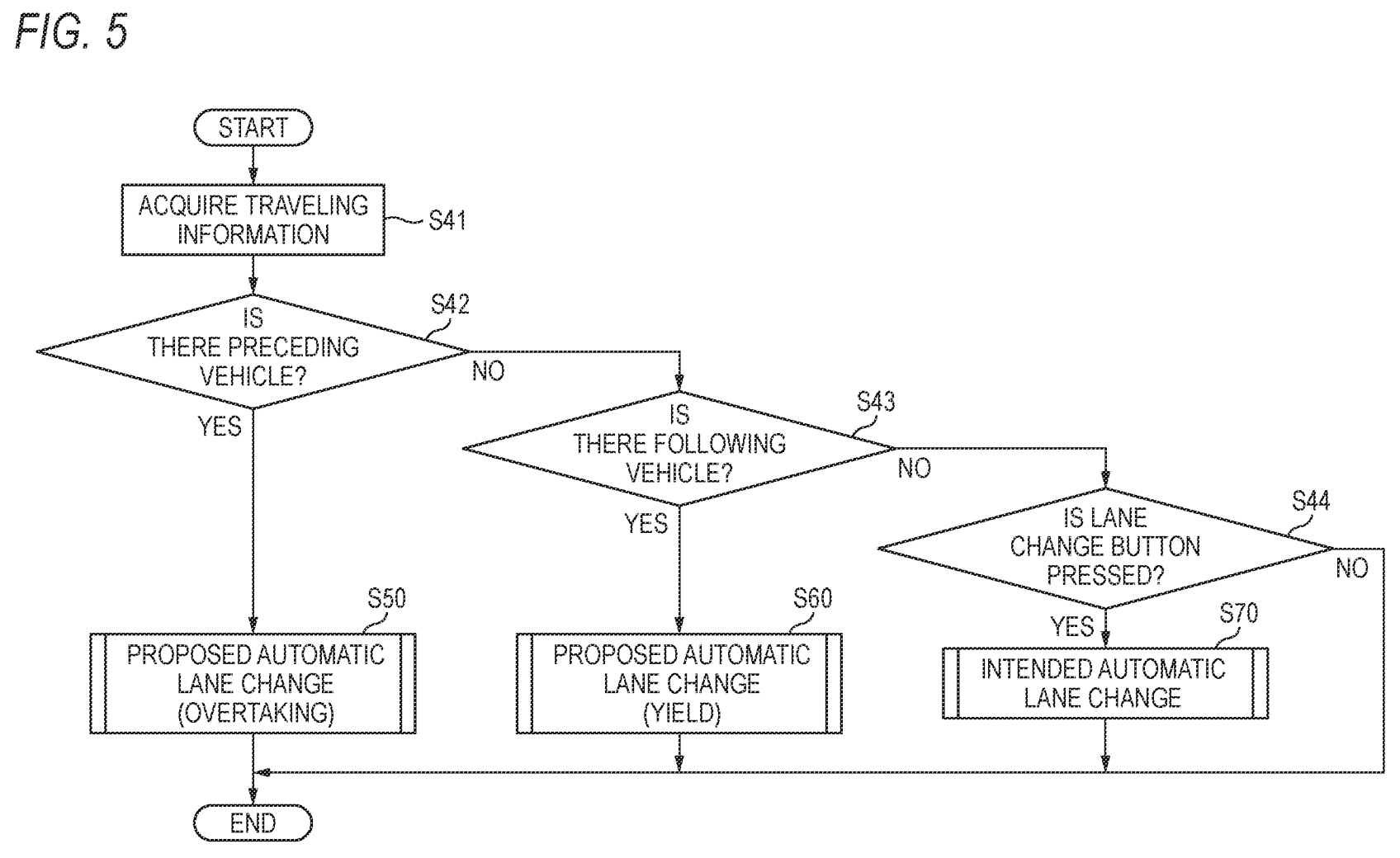

START

S41 ACQUIRE TRAVELING INFORMATION

S42 IS THERE PRECEDING VEHICLE?

YES → S50 PROPOSED AUTOMATIC LANE CHANGE (OVERTAKING)

NO → S43 IS THERE FOLLOWING VEHICLE?

YES → S60 PROPOSED AUTOMATIC LANE CHANGE (YIELD)

NO → S44 IS LANE CHANGE BUTTON PRESSED?

YES → S70 INTENDED AUTOMATIC LANE CHANGE

NO →

END

VEHICLE CONTROL APPARATUS

CROSS-REFERENCE TO RELATED APPLICATION

The present application claims priority from Japanese Patent Application No. 2021-009148 filed on Jan. 22, 2021, the entire content of which is incorporated herein by reference.

TECHNICAL FIELD

The present invention relates to a vehicle control apparatus.

BACKGROUND ART

As a function of automatic driving and driving assistance of a vehicle, a function has been developed in which a vehicle performs a lane change without an operation of a driver. For example, JP-A-2018-103767 discloses a lane change assistance apparatus configured to, based on an operation of a turn signal lever by a driver, start lane change assistance control when the turn signal lever is held at a first operation position for a predetermined time or more, and stop the lane change assistance control when the turn signal lever is operated to a second operation position. The turn signal lever of the assistance apparatus is configured to be selectively operable, in a clockwise operation direction and a counterclockwise operation direction, between the first operation position where the turn signal lever is rotated by a first stroke from a neutral position and the second operation position where the turn signal lever is rotated by a second stroke deeper than the first operation position from the neutral position.

However, in the lane change assistance apparatus of JP-A-2018-103767, when receiving assistance control of the lane change, the turn signal lever needs to be held at the first operation position for a predetermined time or more, between the first operation position and the second operation position that are the operation positions of the turn signal lever. Further, in accordance with a direction in which a lane is changed (a left lane change or a right lane change), an operation direction (a counterclockwise operation or a clockwise operation) of the turn signal lever needs to be changed. Therefore, the operation for receiving the assistance control of the lane change is not necessarily a simple turn signal lever operation, and there is room for improvement in a content of the operation.

SUMMARY

An object of the present invention is to provide a vehicle control apparatus that can facilitate an operation of a lane change.

According to an aspect of the present invention, there is provided a vehicle control apparatus includes a recognition unit configured to recognize an environment in a vicinity of a vehicle; and a traveling control unit configured to execute a lane change of the vehicle based on a recognition result by the recognition unit. The traveling control unit selectively executes a lane change of the vehicle based on proposal information of a lane change output to a driver of the vehicle by the traveling control unit and a lane change of the vehicle not based on the proposal information in response to a first operation of the same content by the driver.

According to the present invention, it is possible to facilitate an operation of a lane change.

BRIEF DESCRIPTION OF DRAWINGS

FIG. 2 is a diagram showing a first control unit, a second control unit, and a traveling control unit of the vehicle control apparatus.

FIG. 3 is a table showing an example of a correspondence relationship among a driving mode, a control state of a host vehicle, and a task.

FIG. 5 is a flowchart showing an example of a processing performed by a traveling control unit.

DESCRIPTION OF EMBODIMENTS

Hereinafter, an embodiment of the present invention will be described with reference to the drawings.

[Overall Configuration]

Figure 1:
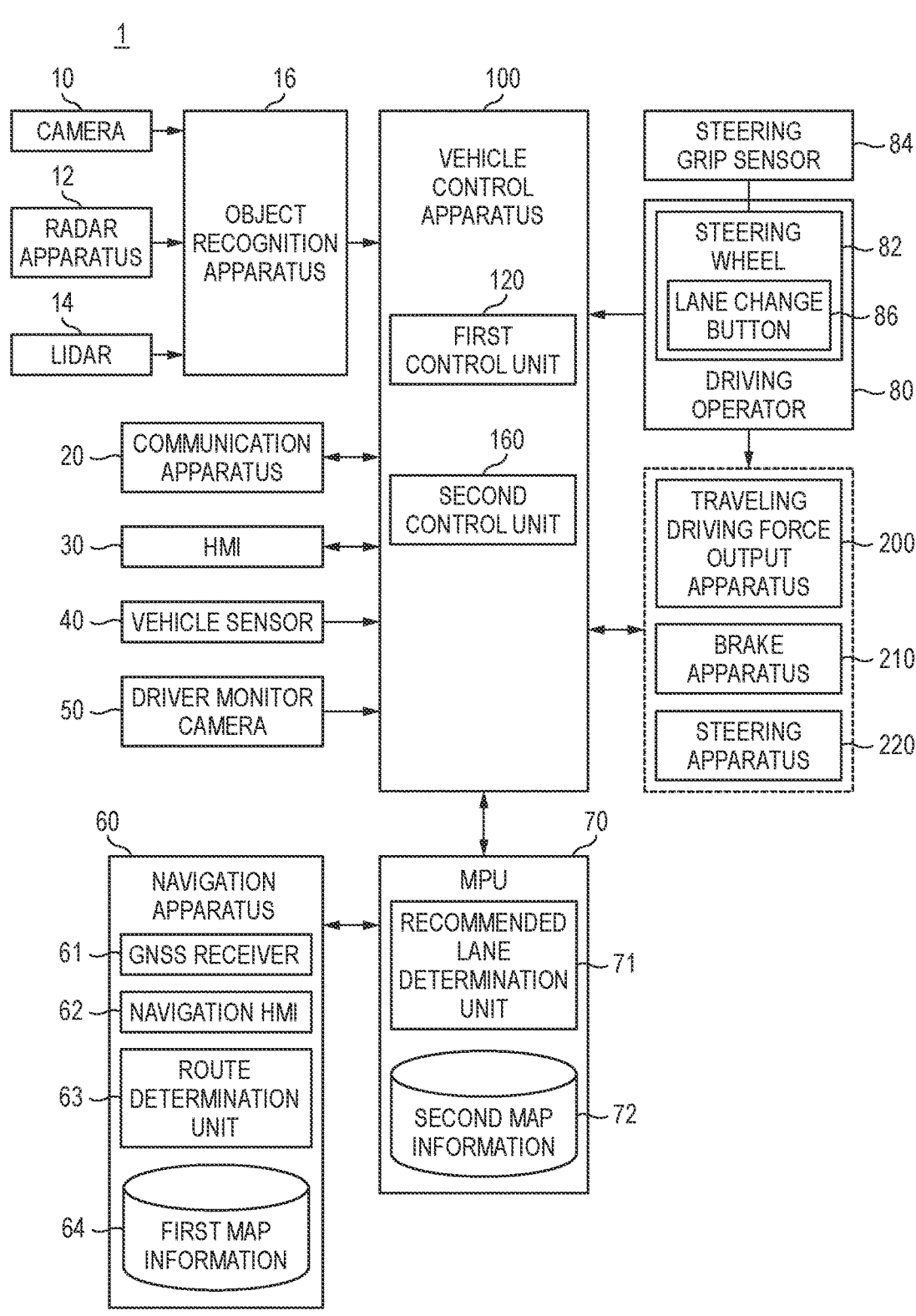
FIG. 1 is a block diagram showing a configuration of a vehicle system on which a vehicle control apparatus is mounted.

FIG. 1 is a block diagram showing a configuration of a vehicle system 1 on which a vehicle control apparatus of the embodiment is mounted. A vehicle on which the vehicle system 1 is mounted is, for example, a vehicle such as a two-wheeled vehicle, a three-wheeled vehicle, or a four-wheeled vehicle, and a driving source of the vehicle is an internal combustion engine such as a diesel engine or a gasoline engine, an electric motor, or a combination thereof. The electric motor operates using electric power generated by a generator connected to the internal combustion engine or electric power discharged from a secondary battery or a fuel cell.

The vehicle system 1 includes, for example, a camera 10, a radar apparatus 12, light detection and ranging (LIDAR) 14, an object recognition apparatus 16, a communication apparatus 20, a human machine interface (HMI) 30, a vehicle sensor 40, a driver monitor camera 50, a navigation apparatus 60, a map positioning unit (MPU) 70, a driving operator 80, a vehicle control apparatus 100, a traveling driving force output apparatus 200, a brake apparatus 210, and a steering apparatus 220. These apparatuses and devices are connected to one another by a multiplex communication line such as a controller area network (CAN) communication line, a serial communication line, a wireless communication network, or the like.

The camera 10 is, for example, a digital camera that uses a solid-state image-capturing element such as a charge coupled device (CCD) or a complementary metal oxide semiconductor (CMOS). The camera 10 is attached to an optional place of the vehicle (hereinafter, referred to as host vehicle M) on which the vehicle system 1 is mounted.

The radar apparatus 12 radiates radio waves such as millimeter waves to a vicinity of the host vehicle M, and detects radio waves reflected by an object (reflected waves) to detect at least a position (a distance and an orientation) of the object. The radar apparatus 12 is attached to an optional place of the host vehicle M.

The LIDAR 14 emits light (or an electromagnetic wave having a wavelength close to that of the light) to the vicinity of the host vehicle M and measures scattered light. The LIDAR 14 detects a distance from a target based on time from light emission to light reception. The emitted light is, for example, pulsed laser light. The LIDAR 14 is attached to an optional place of the host vehicle M.

The object recognition apparatus 16 performs a sensor fusion processing on detection results of some or all of the camera 10, the radar apparatus 12, and the LIDAR 14 to recognize a position, a type, a speed, and the like of an object. The object recognition apparatus 16 outputs a recognition result to the vehicle control apparatus 100. The object recognition apparatus 16 may output the detection results of the camera 10, the radar apparatus 12, and the LIDAR 14 to the vehicle control apparatus 100 as they are.

The communication apparatus 20 communicates with other vehicles present in the vicinity of the host vehicle M by using, for example, a cellular network, a Wi-Fi (registered trademark) network, a Bluetooth (registered trademark), dedicated short range communication (DSRC), or the like, or communicates with various server apparatuses via a wireless base station.

The HMI 30 presents various pieces of information to an occupant of the host vehicle M and receives an input operation by the occupant. The HMI 30 includes various display apparatuses, speakers, buzzers, touch panels, switches, keys, and the like.

The vehicle sensor 40 includes a vehicle speed sensor that detects a speed of the host vehicle M, an acceleration sensor that detects an acceleration, a yaw rate sensor that detects an angular speed around a vertical axis, an orientation sensor that detects a direction of the host vehicle M, and the like.

The driver monitor camera 50 is, for example, a digital camera that uses a solid-state image-capturing element such as a CCD or a CMOS. The driver monitor camera 50 is attached to an optional place of the host vehicle M at a position and in a direction where an image of a head of an occupant (hereinafter, referred to as driver) seated in a driver seat of the host vehicle M can be captured from a front (in a direction in which an image of a face is captured).

The navigation apparatus 60 includes, for example, a global navigation satellite system (GNSS) receiver 61, a navigation HMI 62, and a route determination unit 63. The navigation apparatus 60 stores first map information 64 in a storage apparatus such as a hard disk drive (HDD) or a flash memory.

The GNSS receiver 61 identifies a position of the host vehicle M based on a signal received from a GNSS satellite. The position of the host vehicle M may be identified or complemented by an inertial navigation system (INS) that uses an output of the vehicle sensor 40.

The navigation HMI 62 includes a display apparatus, a speaker, a touch panel, a key, and the like. The navigation HMI 62 may be partially or entirely shared with the HMI 30 described above.

For example, the route determination unit 63 determines, with reference to the first map information 64, a route (hereinafter, referred to as on-map route) from a position of the host vehicle M identified by the GNSS receiver 61 (or an input optional position) to a destination input by the occupant by using the navigation HMI 62. The first map information 64 is, for example, information in which a road shape is represented by a link indicating a road and a node connected by the link. The first map information 64 may include a curvature of a road, point of interest (POI) information, and the like. The on-map route is output to the MPU 70.

The navigation apparatus 60 may perform route guidance that uses the navigation HMI 62 based on the on-map route. The navigation apparatus 60 may transmit a current position and a destination to a navigation server via the communication apparatus 20 and acquire a route equivalent to the on-map route from the navigation server.

The MPU 70 includes, for example, a recommended lane determination unit 71, and stores second map information 72 in a storage apparatus such as an HDD or a flash memory. The recommended lane determination unit 71 divides the on-map route provided from the navigation apparatus 60 into a plurality of blocks (for example, divides the on-map route every 100 [m] in a vehicle traveling direction), and determines a recommended lane for each block with reference to the second map information 72. For example, the recommended lane determination unit 71 determines which lane from a left the vehicle travels in. When there is a branching place on the on-map route, the recommended lane determination unit 71 determines a recommended lane such that the host vehicle M can travel on a reasonable route for traveling to a branch destination.

The second map information 72 is map information having accuracy higher than that of the first map information 64. The second map information 72 includes, for example, information on a center of a lane, information on a boundary of the lane, or the like. Further, the second map information 72 may include road information, traffic regulation information, address information, facility information, telephone number information, and the like. The second map information 72 may be updated as needed by the communication apparatus 20 communicating with another apparatus.

The driving operator 80 includes, for example, an accelerator pedal, a brake pedal, a shift lever, and other operators in addition to a steering wheel 82 (an example of a steering apparatus). A sensor that detects an operation amount or presence or absence of an operation is attached to the driving operator 80, and a detection result thereof is output to the vehicle control apparatus 100 or some or all of the traveling driving force output apparatus 200, the brake apparatus 210, and the steering apparatus 220. The steering wheel 82 does not necessarily have to be annular, and may be in a form of an irregularly shaped steering member, a joystick, a button, or the like.

A steering grip sensor 84 is attached to the steering wheel 82. The steering grip sensor 84 is implemented by an electrostatic capacitance sensor or the like, and outputs a signal capable of detecting whether the driver grips the steering wheel 82 to the vehicle control apparatus 100. Further, the steering wheel 82 is provided with a lane change button 86 (an example of a pressing button). The lane change button 86 is an operator for changing a lane of the host vehicle M, and is operated by the driver. When operated, the lane change button 86 outputs a lane change signal that instructs a lane change to the vehicle control apparatus 100.

The vehicle control apparatus 100 includes a first control unit 120 and a second control unit 160. Each of the first control unit 120 and the second control unit 160 is implemented by, for example, a hardware processor such as a central processing unit (CPU) executing a program (software). Further, some or all of these components may be implemented by hardware (including circuitry) such as large scale integration (LSI), an application specific integrated circuit (ASIC), a field-programmable gate array (FPGA), or a graphics processing unit (GPU), or may be implemented by cooperation of software and the hardware. The program may be stored in advance in a storage apparatus such as an HDD or a flash memory of the vehicle control apparatus 100.

FIG. 2 is a block diagram showing functions of the first control unit 120, the second. control unit 160, and a traveling control unit 170. The first control unit 120 includes, for example, a recognition unit 130, an action plan generation unit 140, and a mode determination unit 150. The first control unit 120 implements, for example, a function based on artificial intelligence (AI) and a function based on a model given in advance in parallel. For example, a function of "recognizing an intersection" may be implemented by executing recognition of the intersection based on deep learning or the like and recognition based on a condition given in advance (there is a signal, a road sign, or the like that can be subjected to pattern matching) in parallel, scoring bath of them, and comprehensively evaluating them. Accordingly, reliability of automatic driving is ensured.

Based on information input from the camera 10, the radar apparatus 12, and the LIDAR 14 via the object recognition apparatus 16, the recognition unit 130 recognizes a position of an object in the vicinity of the host vehicle M and a traveling state such as a speed and an acceleration of the object. The position of the object is recognized as, for example, a position on absolute coordinates with a representative point (a center of gravity, a driving shaft center, or the like) of the host vehicle M as an origin, and is used for control. The position of the object may be represented by a representative point such as a center of gravity or a corner of the object, or may be represented by a region. The "state" of the object may include acceleration, a jerk, or an "action state" of the object (for example, whether the object is changing a lane or is about to change the lane).

Further, the recognition unit 130 recognizes, for example, a traveling environment in which the host vehicle M travels. For example, the recognition unit 130 recognizes a traveling lane of the host vehicle M by comparing a pattern of road partition lines (for example, an arrangement of solid lines and broken lines) obtained from the second map information 72 with a pattern of road partition lines in the vicinity of the host vehicle M recognized from an image captured by the camera 10. The recognition unit 130 may recognize a traveling lane by recognizing traveling boundaries (road boundaries) including the road partition lines, road shoulders, curbstones, a median strip, guard rails, or the like, without being limited to the road partition lines. In the recognition, a position of the host vehicle M acquired from the navigation apparatus 60 or a processing result by the INS may be added. Further, the recognition unit 130 recognizes a temporary stop line, an obstacle, a red light, a toll gate, and other road events.

When recognizing the traveling lane, the recognition unit 130 recognizes a position and a posture of the host vehicle M with respect to the traveling lane. For example, the recognition unit 130 may recognize a deviation of a reference point of the host vehicle M from a center of the lane and an angle formed with respect to a line that connects the center of the lane in a traveling direction of the host vehicle M as a relative position and a posture of the host vehicle M with respect to the traveling lane. Alternatively, the recognition unit 130 may recognize the position of the reference point of the host vehicle M with respect to any side end portion (a road partition line or a road boundary) of the traveling lane or the like as the relative position of the host vehicle M with respect to the traveling lane.

In principle, the action plan generation unit 140 generates a target trajectory along which the host vehicle M travels in the future automatically (without depending on an operation of the driver) such that the host vehicle M travels in a recommended lane determined by the recommended lane determination unit 71 and can cope with a surrounding situation of the host vehicle M. The target trajectory includes, for example, a speed element. For example, the target trajectory is represented by sequentially arranging points (trajectory points) to be reached by the host vehicle M. The trajectory point is a point where the host vehicle M should arrive for each predetermined traveling distance (for example, about several [m]) at a road distance, and separately, a target speed and a target acceleration for each predetermined sampling time (for example, about 0 decimal point [sec]) are generated as a part of the target trajectory. Further, the trajectory point may be a position where the host vehicle M should arrive at a sampling time point for each predetermined sampling time. In this case, information on the target speed and the target acceleration is represented by an interval between the trajectory points.

When generating e target trajectory, the action plan generation unit 140 may set an event of automatic driving. Examples of the vent of the automatic driving include a constant speed traveling event, a low speed following traveling event, a lane change event, a branching event, a merging event, and a takeover event. The action plan generation unit 140 generates a target trajectory in accordance with an activated event.

The mode determination unit 150 determines a driving mode of the host vehicle M to be any one of a plurality of driving modes in which tasks imposed on the driver are different. Further, when a task of the determined driving mode (hereinafter, referred to as current driving mode) is not executed by the driver, the mode determination unit 150 changes the driving mode of the host vehicle M to a driving mode in which a task is heavier.

FIG. 3 is a table showing an example of a correspondence relationship among a driving mode, a control state of the host vehicle M, and a task. Driving modes of the host vehicle M include, for example, five modes from a first driving mode to a fifth driving mode. The control state, that is, a degree of automation of driving control of the host vehicle M is the highest in the first driving mode, then decreases in an order of the second driving mode, the third driving mode, and the fourth driving mode, and is the lowest in the fifth driving mode. On the contrary, a task imposed on the driver is the lightest in the first driving mode, then becomes heavy in an order of the second driving mode, the third driving mode, and the fourth driving mode, and is the heaviest in the fifth driving mode. In a driving mode other than the first driving mode, the vehicle control apparatus 100 is in a control state that is not automatic driving. Therefore, the vehicle control apparatus 100 is in charge of ending control of the automatic driving and shifting to driving assistance or manual driving. Hereinafter, contents of the respective driving modes will be exemplified.

In the first driving mode, an automatic driving state is established, and neither front monitoring nor gripping of the steering wheel 82 (steering gripping in the drawing) is imposed on the driver. However, even in the first driving mode, the driver is required to be in a posture in which the driver can quickly shift to the manual driving in response to a request from the vehicle control apparatus 100. The "automatic driving" as used herein means that both steering and acceleration and deceleration are controlled without depending on an operation of the driver. The front means a space in the traveling direction of the host vehicle M visually recognized via a front windshield. The first driving mode is, for example, a driving mode that can be executed when a condition that the host vehicle M travels at a predetermined speed or less (for example, about 60 [km/h]) on an automobile dedicated road such as an expressway and there is a preceding vehicle to be followed is satisfied.

In the second driving mode, a driving assistance state is established, and a task of monitoring a front of the host vehicle M (hereinafter, referred to as front monitoring) is imposed on the driver, but a task of gripping the steering wheel 82 is not imposed on the driver. In the third driving mode, the driving assistance state is established, and a task of front monitoring and a task of gripping the steering wheel 82 are imposed on the driver. The fourth driving mode is a driving mode in which a certain degree of driving operation by the driver is necessary for at least one of the steering and the acceleration and deceleration of the host vehicle M. For example, in the fourth driving mode, driving assistance such as adaptive cruise control (ACC) and lane keeping assist system (LKAS) is performed. In the fifth driving mode, both the steering and the acceleration and deceleration are in a manual driving state where a driving operation by the driver is necessary. In both the fourth driving mode and the fifth driving mode, naturally, the task of monitoring the front of the host vehicle M is imposed on the driver.

Returning to FIG. 2, the second control unit 160 performs control such that the host vehicle M passes through the target trajectory generated by the action plan generation unit 140 at a scheduled time point. The second control unit 160 includes, for example, an acquisition unit 162, a speed control unit 164, and a steering control unit 166.

The acquisition unit 162 acquires information on the target trajectory (trajectory point) generated by the action plan generation unit 140, and stores the acquired information in a memory (not shown). The speed control unit 164 controls the traveling driving force output apparatus 200 (see FIG. 1) or the brake apparatus 210 (see FIG. 1) based on a speed element associated with the target trajectory stored in the memory. The steering control unit 166 controls the steering apparatus 220 (see FIG. 1) in accordance with a degree of curvature of the target trajectory stored in the memory. The processings of the speed control unit 164 and the steering control unit 166 are implemented by, for example, a combination of feedforward control and feedback control.

In the vehicle control apparatus 100, a combination of the action plan generation unit 140 and the second control unit 160 constitutes the traveling control unit 170. The traveling control unit 170 executes control of automatic lane change of the host vehicle M based on a recognition result of a traveling situation, a traveling environment, or the like of the host vehicle M recognized by the recognition unit 130.

The traveling control unit 170 selects one lane change mode from a plurality of lane change modes having different degrees of involvement by the driver of the host vehicle M, and performs traveling control in accordance with the selected lane change mode. The plurality of lane change modes having different degrees of involvement by the driver of the host vehicle M can be referred to as a plurality of lane change modes having different degrees of automation. The smaller the degree of involvement by the driver is, the higher the degree of automation is, and the larger the degree of involvement by the driver is, the lower the degree of automation is.

For example, the plurality of lane change modes may include the following three automatic lane change modes. The first automatic lane change is an intended automatic lane change in which the driver of the host vehicle M himself/herself intends to change a lane and the driver of the host vehicle M instructs a start of the lane change. In the intended automatic lane change, the driver of the host vehicle M determines whether the lane change should be performed in consideration of a traveling situation of another vehicle, a route to a destination, and the like. When the lane change should be performed, the driver of the host vehicle M gives an instruction to start the lane change to the host vehicle M by operating the lane change button 86. Based on the instruction, the traveling control unit 170 starts the automatic lane change at an executable timing in consideration of a surrounding traveling situation.

The second automatic lane change is a proposed automatic lane change in which the traveling control unit 170 proposes a lane change and the driver of the host vehicle M approves the lane change. In the proposed automatic lane change, the traveling control unit 170 determines whether the lane change should be performed based on a traveling situation of another vehicle, a route to a destination, and the like. When the lane change should be performed, the traveling control unit 170 proposes the lane change to the driver. When approving the proposal for the lane change, the driver of the host vehicle M gives an instruction to start the lane change to the host vehicle M by operating the lane change button 86. Based on the instruction, the traveling control unit 170 starts the automatic lane change at an executable timing in consideration of a surrounding traveling situation. Therefore, when the driver does not approve the proposal for the lane change, that is, when the driver does not operate the lane change button 86, the automatic lane change is not executed.

The third automatic lane change is a determination automatic lane change in which the traveling control unit 170 determines a lane change and the traveling control unit 170 determines to start the lane change. In the determination automatic lane change, the traveling control unit 170 determines whether the lane change should be performed based on a traveling situation of another vehicle, a route to a destination, and the like. When the lane change should be performed, the traveling control unit 170 starts the automatic lane change at an executable timing in consideration of a surrounding traveling situation. In a case of the determination automatic lane change, the driver of the host vehicle M is not involved in the lane change.

The vehicle control apparatus 100 executes an automatic lane change in accordance with a driving mode. For example, the vehicle control apparatus 100 may execute the determination automatic lane change in the first driving mode. The vehicle control apparatus 100 may execute the proposed automatic lane change in the second driving mode, the third driving mode, and the fourth driving mode. The vehicle control apparatus 100 may execute the intended automatic lane change in the third driving mode and the fourth driving mode. The vehicle control apparatus 100 does not execute any automatic lane change in the fifth driving mode.

Returning to FIG. 1, the traveling driving force output apparatus 200 outputs a traveling driving force (torque) for the vehicle to travel to driving wheels. The traveling driving force output apparatus 200 includes, for example, a combination of an internal combustion engine, an electric motor, a transmission, and the like, and an electronic control unit (ECU) that controls these components. The ECU controls the above-described configuration in accordance with information input from the second control unit 160 or information input from the driving operator 80.

The brake apparatus 210 includes, for example, a brake caliper, a cylinder that transmits a hydraulic pressure to the brake caliper, an electric motor that causes the cylinder to generate a hydraulic pressure, and a brake ECU. The brake ECU controls the electric motor in accordance with the information input from the second control unit 160 or the information input from the driving operator 80 such that a brake torque in accordance with a braking operation is output to each wheel.

The steering apparatus 220 includes, for example, a steering ECU and an electric motor. The electric motor, for example, changes a direction of steered wheels by applying a force to a rack and pinion mechanism. The steering ECU drives the electric motor and changes the direction of the steered wheels in accordance with the information input from the second control unit 160 or the information input from the driving operator 80.

Figure 4:
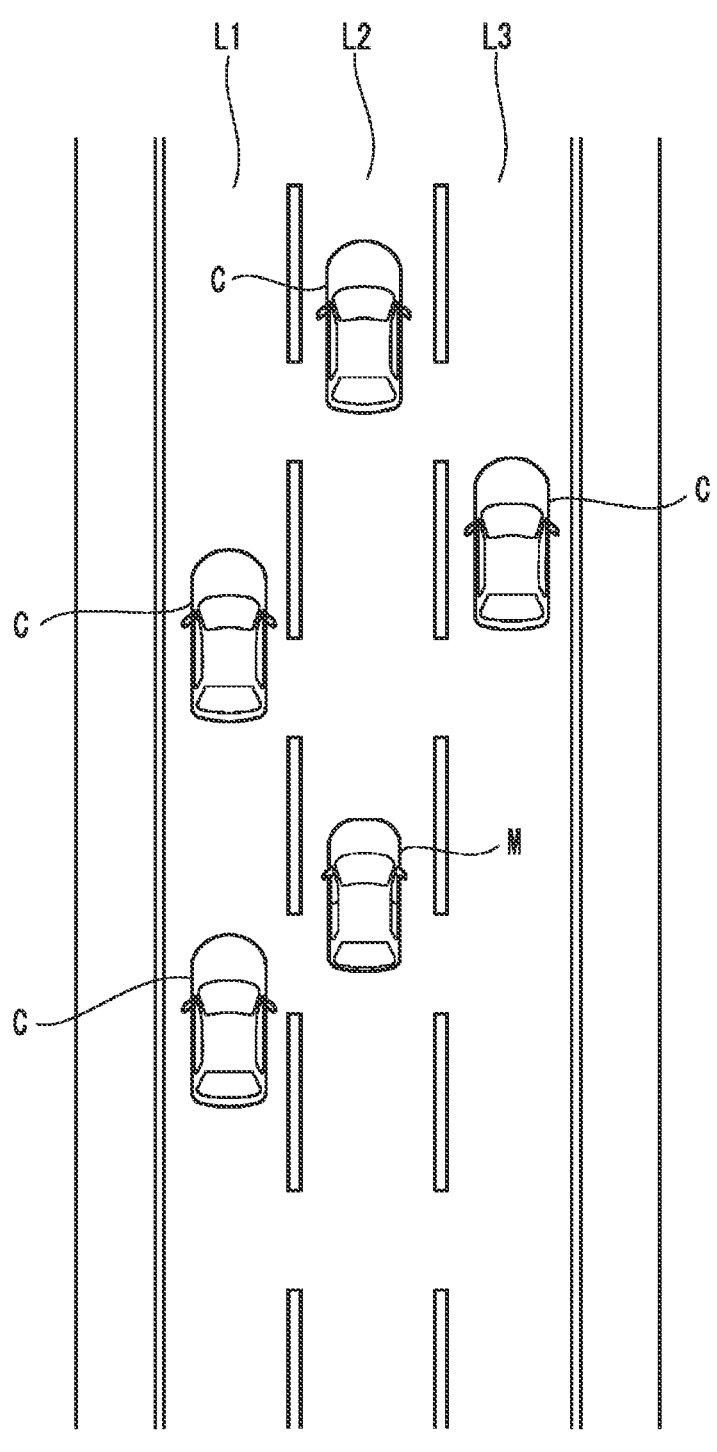
FIG. 4 is a diagram showing an example of a road on which the host vehicle travels.

Next, the automatic lane change executed by the traveling control unit 170 will be described with reference to FIGS. 4 to 12. As shown in FIG. 4, the host vehicle M travels in a center lane L2 of a three-lane road including a left lane L1, the center lane L2, and a right lane L3. Other vehicles C other than the host vehicle M travel in the left lane L1, the center lane L2, and the right lane L3.

The traveling control unit 170 repeatedly executes, for example, a processing shown in FIG. 5. First, the traveling control unit 170 acquires various pieces of traveling information such as a traveling situation or a traveling environment of the host vehicle M recognized by the recognition unit 130 (step S41). The various pieces of traveling information may include a state (a speed or the like) of the host vehicle M, a surrounding environment (a state of partition lines or the like), and states (speeds, positions, or the like of surrounding vehicles) of the surrounding vehicles.

Next, the traveling control unit 170 determines whether there is a preceding vehicle in the center lane L2 in which the host vehicle M travels, based on current traveling information acquired from the recognition unit 130 (step S42). The preceding vehicle referred to here is another vehicle that travels in front of the host vehicle M in the same lane as that of the host vehicle M at a speed lower than a traveling speed of the host vehicle M, and means another vehicle that the host vehicle M overtakes soon.

In step S42, when there is the preceding vehicle in the center lane L2 (step S42: Yes), the traveling control unit 170 proceeds to a processing (FIG. 8) of the proposed automatic lane change (overtaking) in step S50.

In step S42, when there is no preceding vehicle in the center lane L2 (step S42: No), the traveling control unit 170 determines whether there is a following vehicle in the center lane L2 in which the host vehicle M travels, based on the current traveling information acquired from the recognition unit 130 (step S43). The following vehicle referred to here is another vehicle that travels behind the host vehicle M in the same lane as that of the host vehicle M at a speed higher than the traveling speed of the host vehicle M, and means another vehicle that overtakes the host vehicle M soon.

In step S43, when there is the following vehicle in the center lane L2 (step S43: Yes), the traveling control unit 170 proceeds to a processing (FIG. 10) of the proposed automatic lane change (yield) in step S60.

In step S43, when there is no following vehicle in the center lane L2 (step S43: No), the traveling control unit 170 determines whether the lane change button 86 of the steering wheel 82 is pressed (step S44).

In step S43, even when there is the following vehicle in the center lane L2, for example, when a distance between the host vehicle M and the following vehicle is equal to or larger than a threshold, the traveling control unit 170 may shift to step S43.

Figure 6:
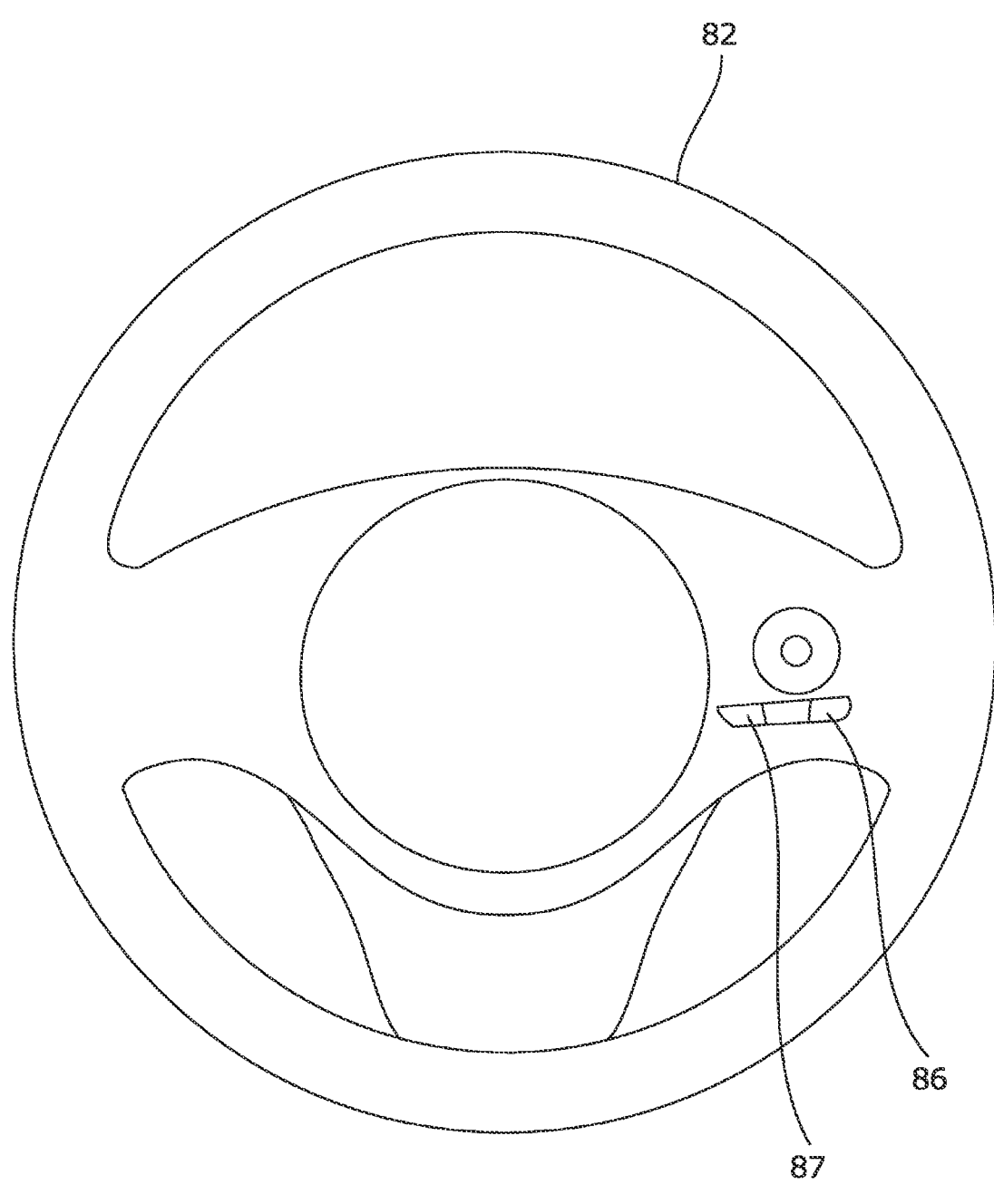
FIG. 6 is a diagram showing examples of lane change buttons provided on a steering wheel.

For example, as shown in FIG. 6, the lane change button 86 is provided at a position and in a shape where a blind operation can be performed with one of gripping hands (for example, one finger of a right hand) when the driver grips the steering wheel 82.

Figure 12:
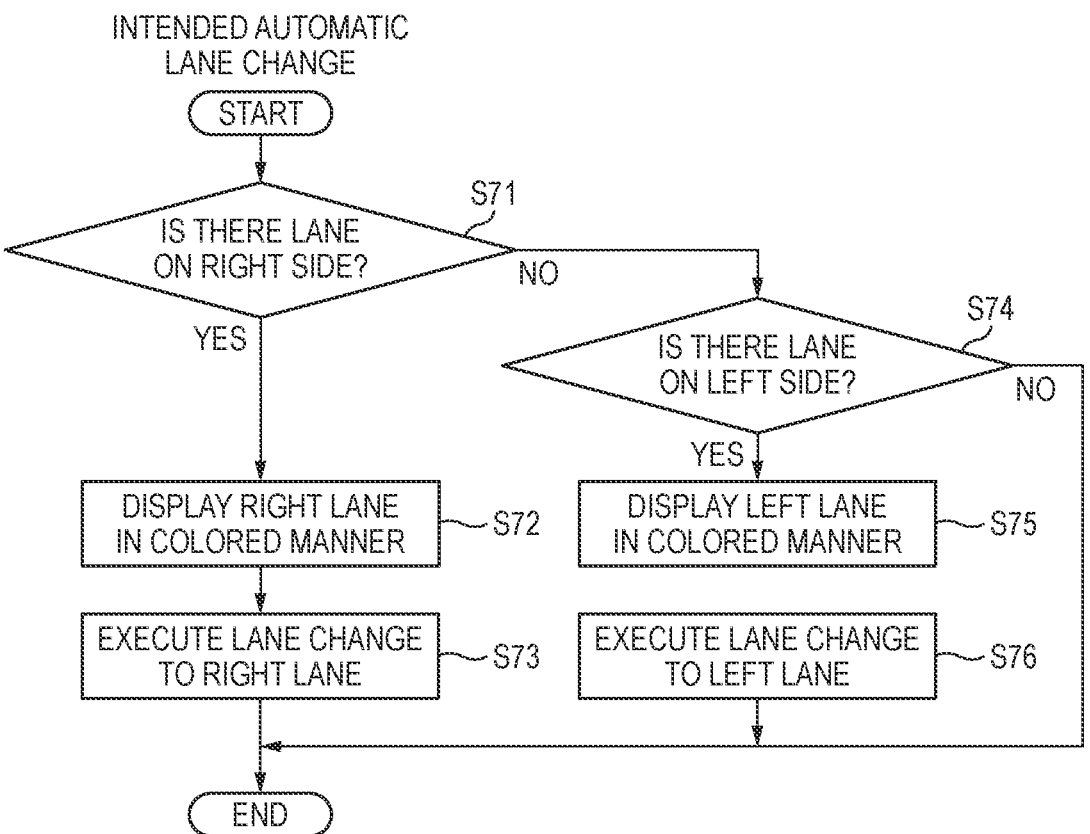
FIG. 12 is a flowchart showing an example of a processing of the intended automatic lane change.

In step S44, when the lane change button 86 is pressed (step S43: Yes), the traveling control unit 170 proceeds to a processing of the intended automatic lane change in step S70 (FIG. 12).

In step S44, when the lane change button 86 is not pressed (step S44: No), the traveling control unit 170 ends a series of processings.

<Processing of Proposed Automatic Lane Change (Overtaking)>

Figure 7:
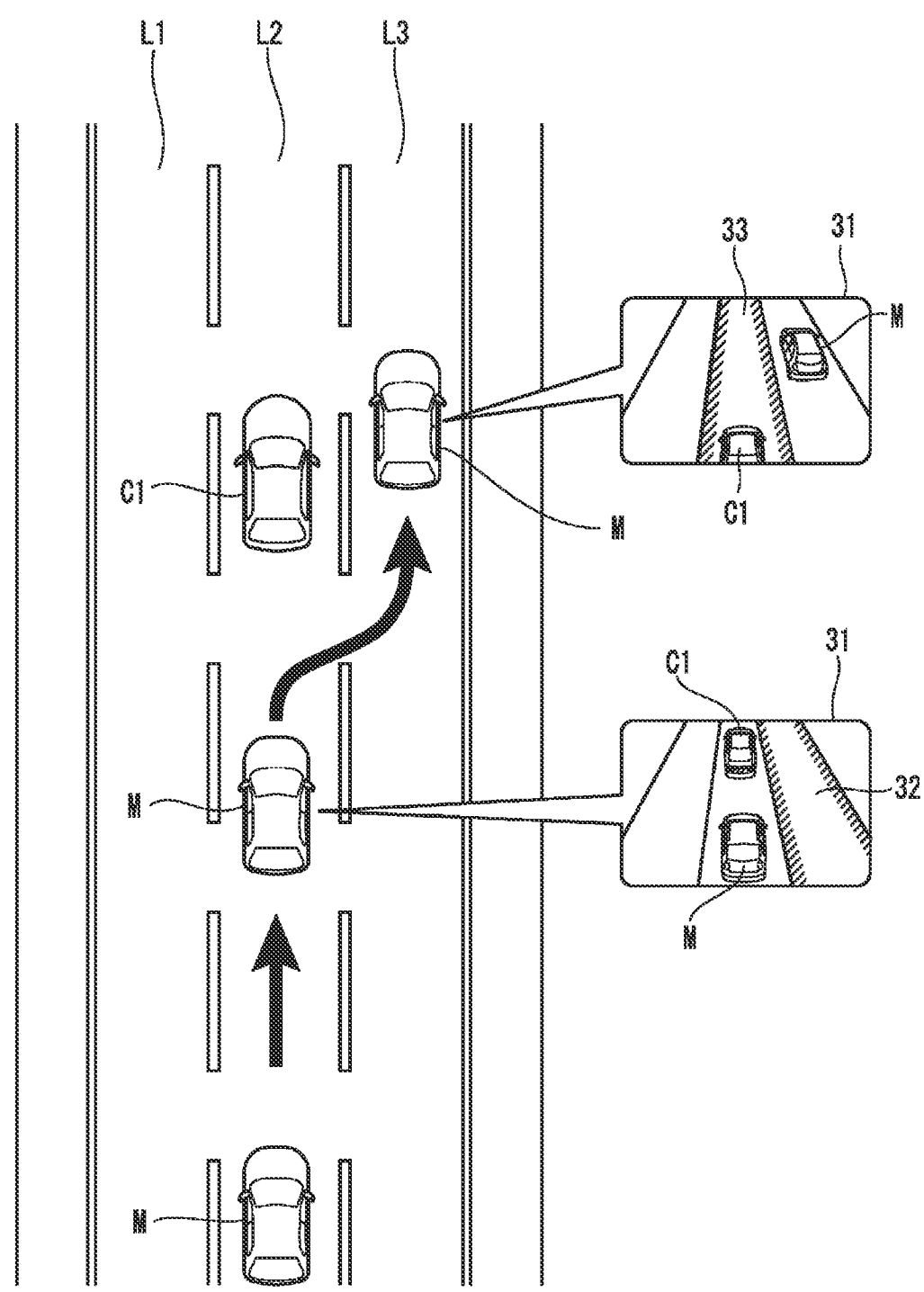
FIG. 7 is a diagram showing an example of a road for illustrating a proposed automatic lane change (overtaking).

As shown in FIG. 7, in front of the host vehicle M that travels in the center lane L2, there is another vehicle C1 (preceding vehicle) that travels in the same center lane L2.

Figure 8:
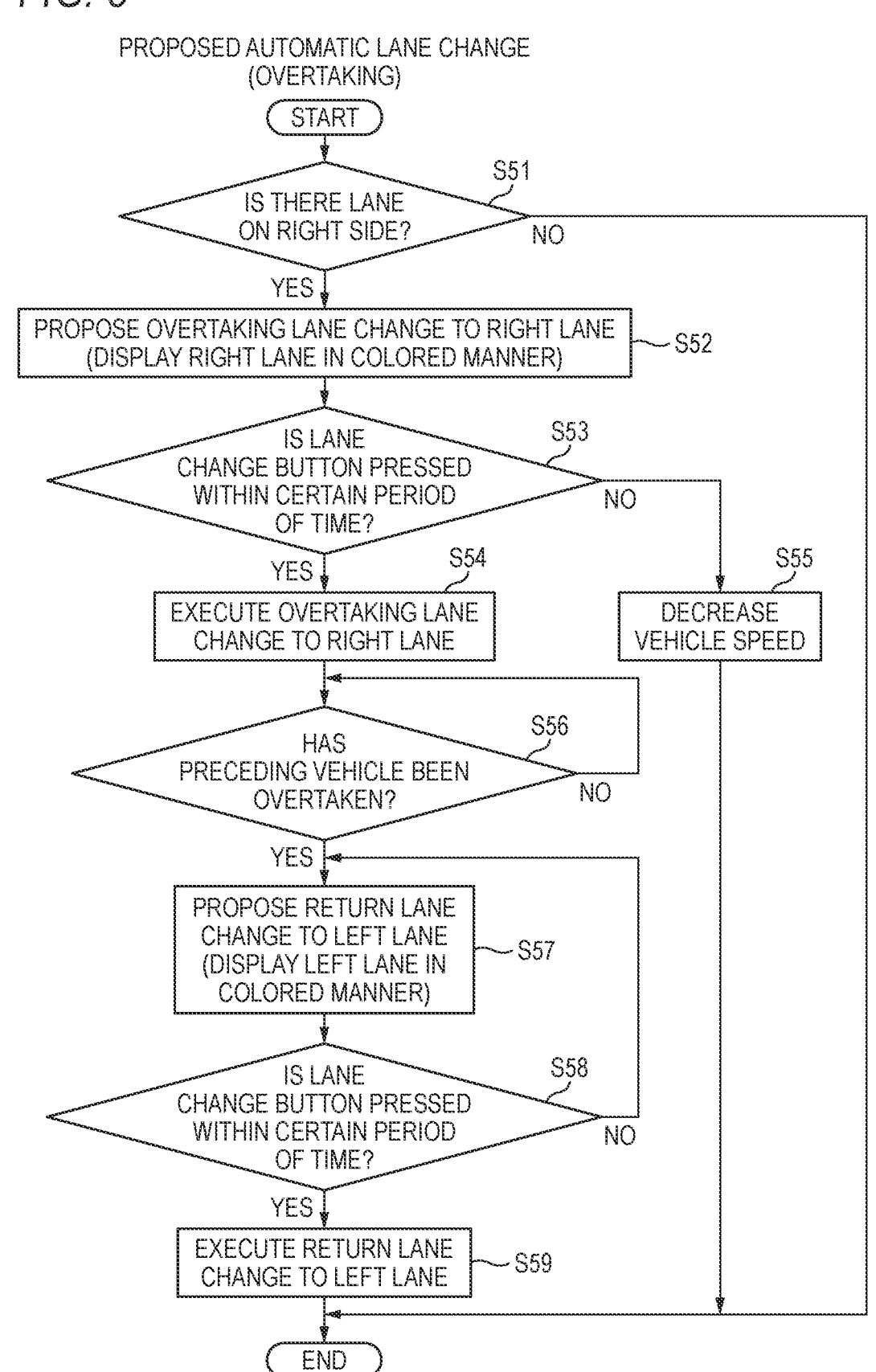
FIG. 8 is a flowchart showing an example of a processing of the proposed automatic lane change (the overtaking).

As shown in FIG. 8, first, the traveling control unit 170 determines whether there is a lane adjacent to a right side (an example of a side in a specific direction) with respect to a lane in which the host vehicle M travels based on the current traveling information acquired from the recognition unit 130 (step S51). Specifically, the traveling control unit 170 determines whether there is an overtaking lane for overtaking the other vehicle C1 on a right side of the center lane L2 in which the host vehicle M travels.

In step S51, when there is no lane on the right side of the lane in which the host vehicle M travels (step S51: No), the traveling control unit 170 continues traveling in the lane in which the host vehicle M currently travels, and ends the processing of the proposed automatic lane change (overtaking).

In step S51, when there is the lane on the right side of the lane in which the host vehicle M travels (step S51: Yes), the traveling control unit 170 proposes an overtaking lane change of changing the lane to the lane on the right side to the driver of the host vehicle M (step S52). Specifically, the traveling control unit 170 proposes an overtaking lane change to the right lane L3 present on the right side of the center lane L2 in which the host vehicle M travels.

When proposing the overtaking lane change, the traveling control unit 170 displays a proposed content as a proposed image on, for example, the display apparatus of the HMI 30 in order to notify the driver of the proposed content. Specifically, as shown in a display apparatus 31 of the HMI 30 shown in FIG. 7, the right lane L3 present on the right side of the center lane L2 in which the host vehicle M travels is displayed in a colored (emphasized) manner as an overtaking lane 32 in which the host vehicle M moves to overtake the other vehicle C1. For example, "Please change the lane to the right lane in order to overtake the other vehicle C1" may be proposed by voice from the speaker of the HMI 30. Further, the proposed image may be displayed on the display apparatus of the navigation HMI 62.

Next, the traveling control unit 170 determines whether the lane change button 86 is pressed within a certain period of time (for example, 20 to 30 seconds) after the overtaking lane change is proposed (step S53). That is, the traveling control unit 170 determines whether the driver of the host vehicle M has approved the overtaking lane change within the certain period. of time in response to the proposal of the overtaking lane change from the traveling control unit 170.

In step S53, when the lane change button 86 is pressed within the certain period of time (step S53: Yes), that is, when the driver approves the proposed overtaking lane change, the traveling control unit 170 executes the overtaking lane change to the lane on the right side of the host vehicle M (step S54). Specifically, the traveling control unit 170 executes the overtaking lane change of the host vehicle M to the right lane L3.

In step S53, when the lane change button 86 is not pressed within the certain period of time (step S53: No), the traveling control unit 170 decreases the traveling speed of the host vehicle M while maintaining the current lane in which the host vehicle M travels (step S55), and ends the processing of the proposed automatic lane change (overtaking). As described above, the other vehicle C1 that is the preceding vehicle is the other vehicle that travels at a speed slower than that of the host vehicle M. Therefore, when the host vehicle M travels in this state, the host vehicle M may overtake the other vehicle C1 soon. Therefore, when the driver of the host vehicle M does not approve the lane change for overtaking, the traveling control unit 170 decreases the traveling speed of the host vehicle M to follow the other vehicle C1 while maintaining the current traveling lane.

After step S54, the traveling control unit 170 determines whether the host vehicle M that performs the overtaking lane change to the lane on the right side has overtaken the other vehicle C1 based on the current traveling information acquired from the recognition unit 130 (step S56).

In step S56, when the host vehicle M cannot overtake the other vehicle C1 (step S56: No), the traveling control unit 170 repeats the processing of step S56 until the host vehicle M can overtake the other vehicle C1.

In step S56, when the host vehicle M has overtaken the other vehicle C1 (step S56: Yes), the traveling control unit 170 proposes, to the driver of the host vehicle M, a return lane change of changing the lane to a lane on a left side, that is, changing the lane to the original lane in which the host vehicle M travels before the overtaking is performed (step S57). Specifically, the traveling control unit 170 proposes the return lane change of returning from the right lane L3 in which the host vehicle M currently travels to the center lane L2 on the left side of the right lane L3.

When proposing the return lane change, the traveling control unit 170 displays a proposed content as a proposed image on, for example, the display apparatus of the HMI 30 in order to notify the driver of the proposed content. Specifically, as shown in the display apparatus 31 shown in FIG. 7, the center lane L2 present on the left side of the right lane L3 in which the host vehicle M travels is displayed in a colored (emphasized) manner as a return lane 33 in which the host vehicle M returns. For example, "Please change the lane to the center lane since the other vehicle C1 can be overtaken" may be proposed by voice from the speaker of the HMI 30.

Next, the traveling control unit 170 determines whether the lane change button 86 is pressed within a certain period of time (for example, 20 to 30 seconds) after the return lane change is proposed (step S58). That is, the traveling control unit 170 determines Whether the driver of the host vehicle M has approved the return lane change within the certain period of time in response to the proposal of the return lane change from the traveling control unit 170. The operation of pressing the lane change button 86 for the proposal of the return lane change in step S58 is an operation of the same content as that of the operation of pressing the lane change button 86 for the proposal of the overtaking lane change in step S53.

In step S58, when the lane change button 86 is not pressed within the certain period of time (step S58: No), the traveling control unit 170 returns to step S57 and proposes the return lane change of changing the lane to the original lane to the driver of the host vehicle M again. When proposing the return lane change again, the number of times of the proposal may be increased as compared with the case of the originally proposed return lane change. For example, in the display apparatus 31 shown in FIG. 7, the display of the right lane L3 in which the host vehicle M currently travels may be omitted, and the return lane 33 in which the host vehicle M returns may be further highlighted.

In step S58, when the lane change button 86 is pressed within the certain period of time (step S58: Yes), that is, when the driver approves the proposed return lane change, the traveling control unit 170 executes the return lane change to the lane on the left side of the host vehicle M (step S59). Specifically, the traveling control unit 170 executes the return lane change of the host vehicle M to the center lane L2. When the host vehicle M overtakes the preceding vehicle (the other vehicle C1) and further returns to the center lane L2 that is the original traveling lane, the traveling control unit 170 ends the processing of the proposed automatic lane change (overtaking).

In this way, according to the vehicle control apparatus 100, the lane changes of the "overtaking lane change" and the "return lane change" when the host vehicle M travels by overtaking the preceding vehicle (the other vehicle C1) can be easily executed by a simple operation of the same content, for example, simply pressing the lane change button 86 once.

In the above embodiment, a case where the host vehicle M travels in the center lane L2 has been described, but fir example, the same processing can be executed also in a case where the host vehicle M travels in the left lane L1. However, when the host vehicle M that travels in the left lane L1 performs the overtaking lane change to the center lane L2 to overtake the preceding vehicle, the traveling control unit 170 may perform control that does not propose the return lane change of returning to the left lane L1 after the overtaking. In this case, the traveling control unit 170 may cause the host vehicle M to continue traveling in the center lane L2 as it is.

For example, in a case where the host vehicle M travels in the right lane L3, when there is a preceding vehicle having a low speed, the traveling control unit 170 may propose the overtaking lane change in which the host vehicle M is moved to the center lane L2 that is the lane on the left side to the driver of the host vehicle M in order to avoid approach to the preceding vehicle. In this case, when the lane change button 86 is pressed by the driver of the host vehicle M, the traveling control unit 170 can cause the host vehicle M to overtake while avoiding the preceding vehicle having the low speed by causing the host vehicle M to travel in the center lane L2. Also in this case, the traveling control unit 170 may perform control that does not propose the return lane change of returning to the right lane L3 after the overtaking.

<Processing of Proposed Automatic Lane Change (Yield)>

Figure 9:
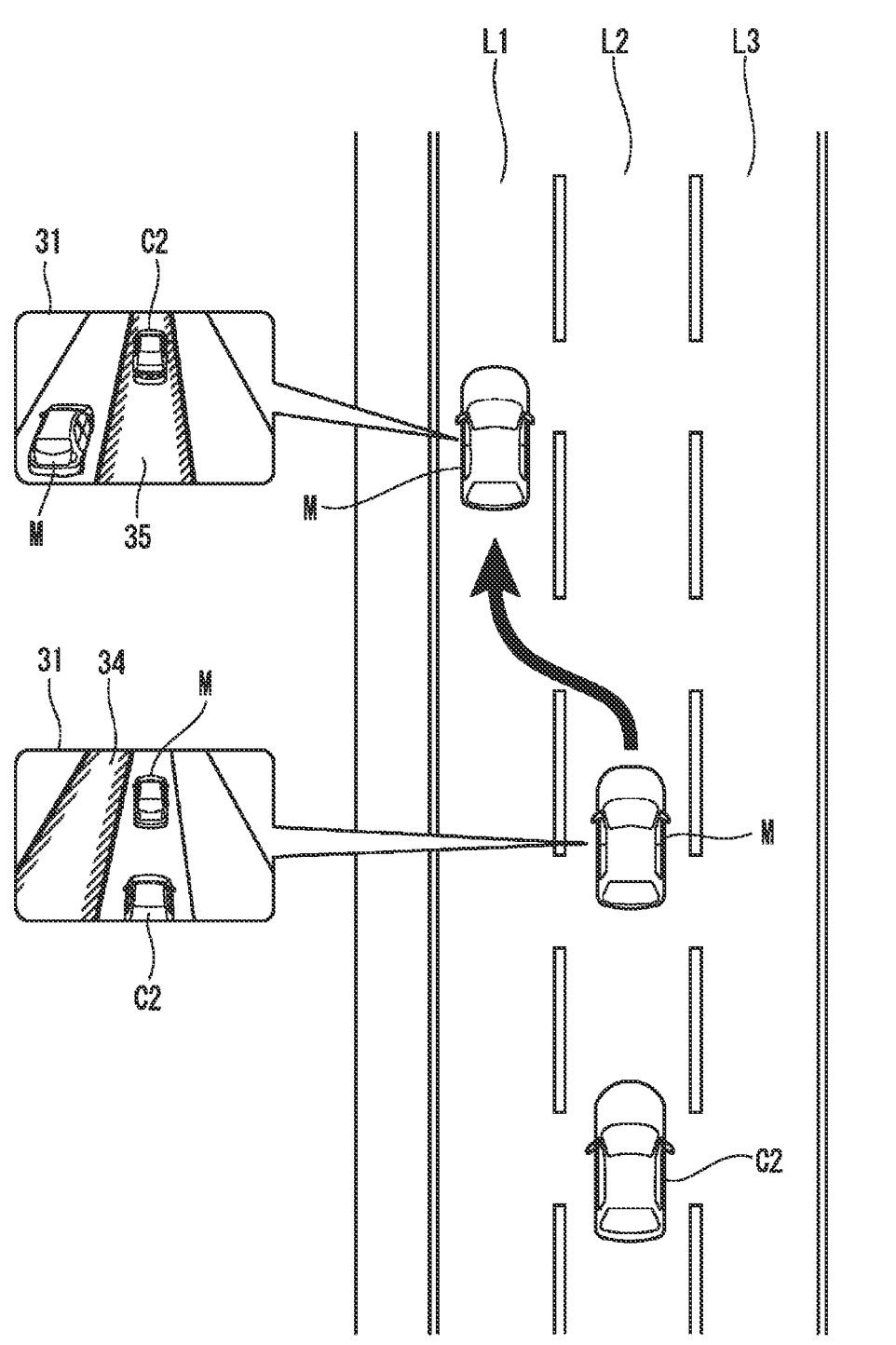
FIG. 9 is a diagram showing an example of a road for illustrating a proposed automatic lane change (yield).

As shown in FIG. 9, behind the host vehicle M that travels in the center lane L2, there is another vehicle C2 (following vehicle) that travels in the same center lane L2.

Figure 10:
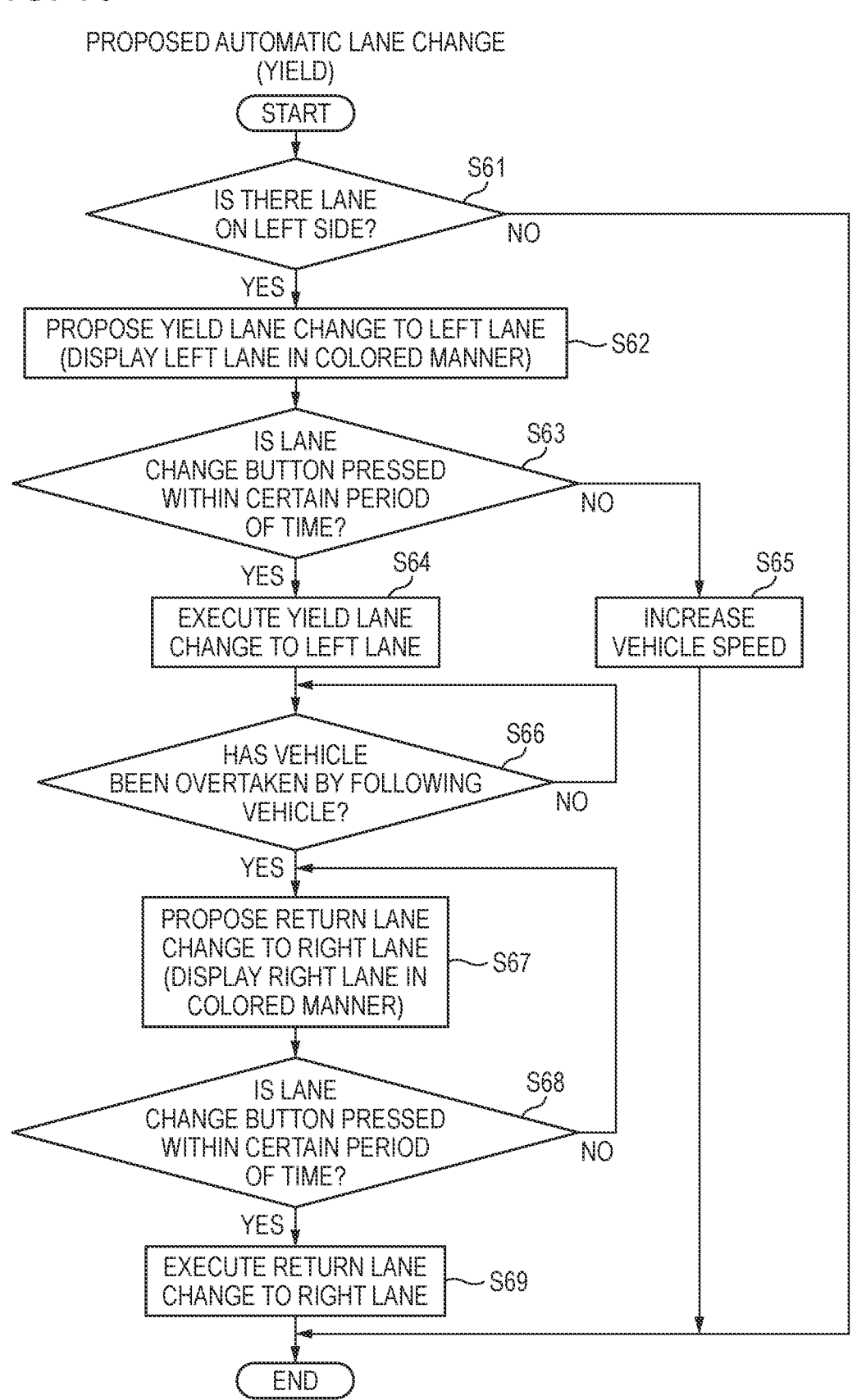
FIG. 10 is a flowchart showing an example of a processing of the proposed automatic lane change (the yield).

As shown in FIG. 10, first, the traveling control unit 170 determines whether there is a lane adjacent to a left side with respect to the lane in which the host vehicle M travels based on current traveling information acquired from the recognition unit 130 (step S61). Specifically, the traveling control unit 170 determines whether there is a yield lane to which the host vehicle M moves in order to yield the traveling in the center lane L2 to the other vehicle C2 on the left side of the center lane L2 in which the host vehicle M travels.

In step S61, when there is no lane on the left side of the lane in which the host vehicle M travels (step S61: No), the traveling control unit 170 continues traveling in the lane in which the host vehicle M currently travels, and ends the processing of the proposed automatic lane change (yield).

In step S61, when there is the lane on the left side of the lane in which the host vehicle M travels (step S61: Yes), the traveling control unit 170 proposes the yield lane change of changing the lane to the lane on the left side to the driver of the host vehicle M (step S62). Specifically, the traveling control unit 170 proposes the yield lane change to the left lane L1 present on the left side of the center lane L2 in which the host vehicle M travels.

When proposing the yield lane change, the traveling control unit 170 displays a proposed content as a proposed image on, for example, the display apparatus of the HMI 30 in order to notify the driver of the proposed content. Specifically, as shown in the display apparatus 31 shown in FIG. 9, the left lane L1 present on the left side of the center lane L2 in which the host vehicle M travels is displayed in a colored (emphasized) manner as a yield lane 34 to which the host vehicle M moves to yield the lane to the other vehicle C2. For example, "Please change the lane to the left lane in order to yield the lane to the other vehicle C2" may be proposed by voice from the speaker of the HMI 30. Further, the proposed image may be displayed on the display apparatus of the navigation HMI 62.

Next, the traveling control unit 170 determines whether the lane change button 86 is pressed within a certain period of time (for example, 20 to 30 seconds) after the yield lane change is proposed (step S63). That is, the traveling control unit 170 determines whether the driver of the host vehicle M has approved the yield lane change within the certain period of time in response to the proposal of the yield lane change from the traveling control unit 170.

In step S63, when the lane change button 86 is pressed within the certain period of time (step S63: Yes), that is, when the driver approves the proposed yield lane change, the traveling control unit 170 executes the yield lane change of moving to the lane on the left side of the host vehicle M (step S64). Specifically, the traveling control unit 170 executes the yield lane change of the host vehicle M that moves to the left lane L1.

In step S63, when the lane change button 86 is not pressed within the certain period of time (step S63: No), the traveling control unit 170 increases the traveling speed of the host vehicle M while maintaining the current lane in which the host vehicle M travels (step S65), and ends the processing of the proposed automatic lane change (yield). As described above, the other vehicle C2 that is the following vehicle is the other vehicle that travels at a speed higher than that of the host vehicle M. Therefore, when the host vehicle M travels in this state, the host vehicle M may be overtaken by the other vehicle C2 soon. Therefore, in a case where the driver of the host vehicle M does not approve the lane change for yielding the lane, when there is no other vehicle in front of the lane in which the host vehicle M travels, the traveling control unit 170 increases the traveling speed of the host vehicle M while maintaining the current traveling lane so as not to interfere with traveling of the other vehicle C2.

After step S64, the traveling control unit 170 determines whether the host vehicle M, which has performed the yield lane change of moving to the lane on the left side, has been overtaken by the other vehicle C2 based on current traveling information acquired from the recognition unit 130 (step S66).

In step S66, when the host vehicle M is not overtaken by the other vehicle C2 (step S66: No), the traveling control unit 170 repeats the processing of step S66 until the host vehicle M is overtaken.

In step S66, when the host vehicle M is overtaken by the other vehicle C2 (step S66: Yes), the traveling control unit 170 proposes, to the driver of the host vehicle M, a return lane change of changing the lane to the lane on the right side, that is, changing the lane to the original lane in which the host vehicle M travels before yielding the lane to the other vehicle C2 (step S67). Specifically, the traveling control unit 170 proposes the return lane change of returning from the left lane L1 in which the host vehicle M currently travels to the center lane L2 on the right side of the left lane L1.

When proposing the return lane change, the traveling control unit 170 displays a proposed content as a proposed image on, for example, the display apparatus of the HMI 30 in order to notify the driver of the proposed content. Specifically, as shown in the display apparatus 31 shown in FIG. 9, the center lane L2 present on the right side of the left lane L1 in which the host vehicle M travels is displayed in a colored (emphasized) manner as a return lane 35 to which the host vehicle M returns. For example, "Please change the lane to the center lane since the host vehicle M is overtaken by the other vehicle C2" may be proposed by voice from the speaker of the HMI 30.

Next, the traveling control unit 170 determines whether the lane change button 86 is pressed within a certain period of time (for example, 20 to 30 seconds) after the return lane change is proposed (step S68). That is, the traveling control unit 170 determines whether the driver of the host vehicle M has approved the return lane change within the certain period of time in response to the proposal of the return lane change from the traveling control unit 170. The operation of pressing the lane change button 86 for the proposal of the return lane change in step S68 is an operation of the same content as that of the operation of pressing the lane change button 86 for the proposal of the yield lane change in step S63.

In step S68, when the lane change button 86 is not pressed within the certain period of time (step S68: No), the traveling control unit 170 returns to step S67 and proposes the return lane change of changing the lane to the original lane to the driver of the host vehicle M again. When proposing the return lane change again, the number of times of the proposal may be increased as compared with the case of the originally proposed return lane change. For example, in the display apparatus 31 shown in FIG. 9, the display of the left lane L1 in which the host vehicle M currently travels may be omitted, and the return lane 35 to which the host vehicle M returns may be further highlighted.

In step S68, when the lane change button 86 is pressed within the certain period of time (step S68: Yes), that is, when the driver approves the proposed return lane change, the traveling control unit 170 executes the return lane change of returning to the lane on the right side of the host vehicle M (step S69). Specifically, the traveling control unit 170 executes the return lane change of the host vehicle M that returns to the center lane L2. When the host vehicle M yields the lane to the following vehicle (the other vehicle C2), is overtaken by the following vehicle, and returns to the center lane L2 that is the original traveling lane, the traveling control unit 170 ends the processing of the proposed automatic lane change (yield).

In this way, according to the vehicle control apparatus 100, the lane changes of the "yield lane change" and the "return lane change" when the host vehicle M yields the traveling lane to the following vehicle (the other vehicle C2) can be easily executed by a simple operation of the same content, for example, simply pressing the lane change button 86 once.

In the above embodiment, a case where the host vehicle M travels in the center lane L2 has been described, but for example, the same processing can be executed also in a case where the host vehicle M travels in the right lane L3. However, when the host vehicle M that travels in the right lane L3 performs the yield lane change to the center lane L2 and yields the lane to the following vehicle, the traveling control unit 170 executes control that does not propose a return lane change of returning to the right lane L3 after the overtaking. In this case, the traveling control unit 170 performs control such that the host vehicle M continues traveling in the center lane L2 as it is.

For example, in a case where the host vehicle M travels in the left lane L1, when there is a following vehicle, the traveling control unit 170 may propose, to the driver of the host vehicle M, a yield lane change in which the host vehicle M is moved to the center lane L2 that is the lane on the right side in order to yield the lane to the following vehicle. In this case, when the lane change button 86 is pressed by the driver of the host vehicle M, the traveling control unit 170 can cause the host vehicle M to travel in the center lane L2, so that it is possible to avoid approach to the following vehicle having a high speed and allow the following vehicle to overtake the host vehicle M. Also in this case, the traveling control unit 170 may perform control that does not propose a return lane change of returning to the left lane L1 after the overtaking.

<Processing of Intended Automatic Lane Change>

Figure 11:
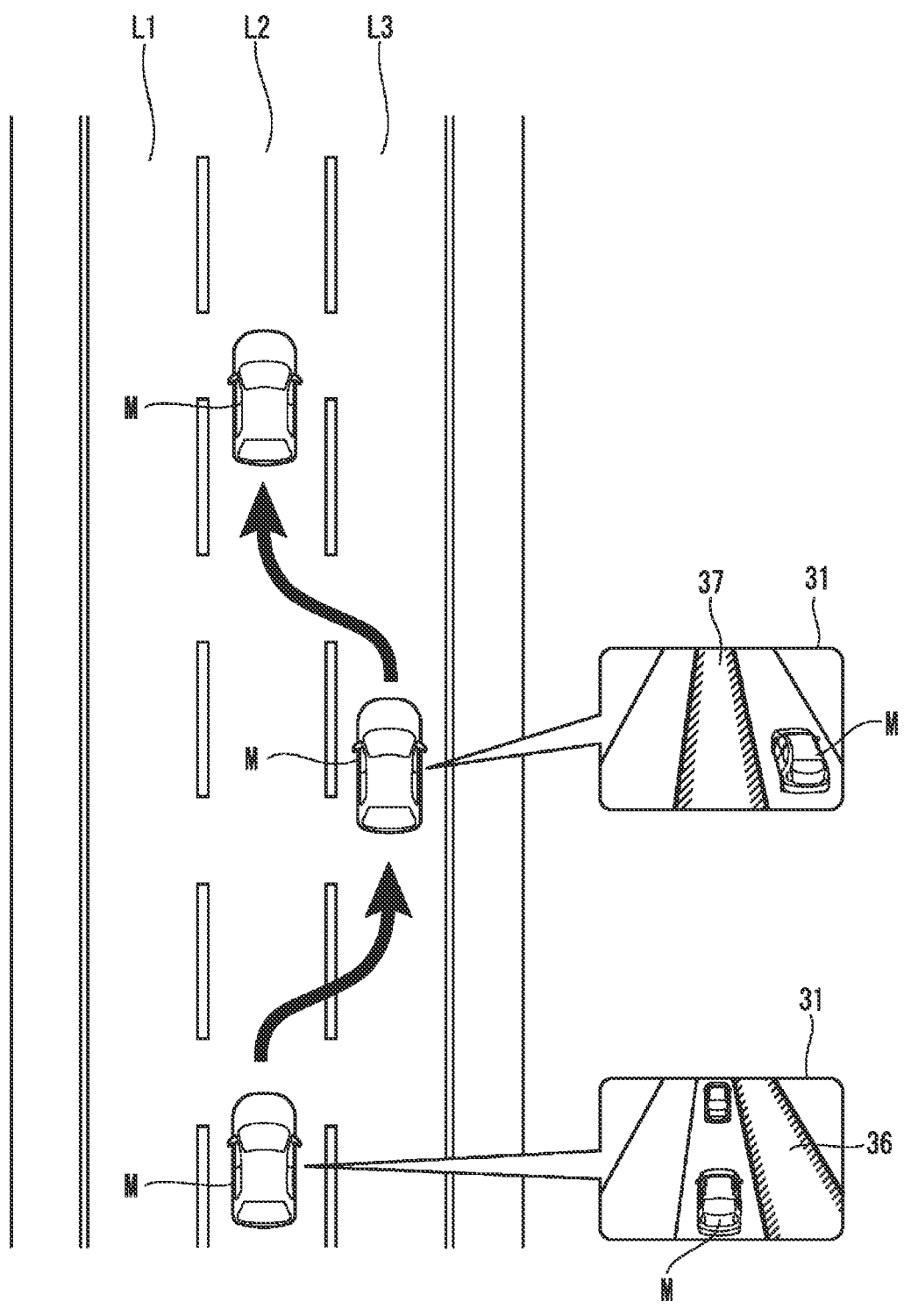
FIG. 11 is a diagram showing an example of a road for illustrating an intended automatic lane change.

As shown in FIG. 11, the host vehicle M travels in the center lane L2.

When the lane change button 86 is pressed in step S44 of FIG. 5, as shown in FIG. 12, first, the traveling control unit 170 determines whether there is a lane adjacent to a right side with respect to the lane in which the host vehicle M travels based on current traveling information acquired from the recognition unit 130 (step S71). Specifically, the traveling control unit 170 determines whether there is a movable lane in which the host vehicle M can move to the right side of the center lane L2 in which the host vehicle M travels.

In step S71, when there is the lane on the right side of the lane in which the host vehicle M travels (step S71: Yes), the traveling control unit 170 displays an advance notice as a moving lane image on, for example, the display apparatus of the HMI 30 in order to notify the driver that there is the movable lane on the right side (step S72). Specifically, as shown in the display apparatus 31 shown in FIG. 11, the right lane L3 present on the right side of the center lane L2 in which the host vehicle M travels is displayed in a colored (emphasized) mariner as a movable lane 36. For example, "change the lane to the right lane based on the instruction" may be notified by voice from the speaker of the HMI 30. Further, the moving lane image may be displayed on the display apparatus of the navigation HMI 62.

Next, the traveling control unit 170 executes the intended automatic lane change to the lane on the right side of the host vehicle M in accordance with an intention of the driver (step S73). Specifically, the traveling control unit 170 executes the intended automatic lane change of the host vehicle M that moves from the center lane L2 to the right lane L3.

In step S71, when there is no lane on the right side of the lane in which the host vehicle M travels (step S71: No), the traveling control unit 170 determines whether there is a lane adjacent to the left side with respect to the lane in which the host vehicle M travels based on the current traveling information acquired from the recognition unit 130 (step S74). Specifically, the traveling control unit 170 determines whether there is a movable lane in which the host vehicle M can move to the left side of the center lane L2 in which the host vehicle M travels.

In step S74, when there is the lane on the left side of the lane in which the host vehicle M travels (step S74: Yes), the traveling control unit 170 displays an advance notice as a moving lane image on, for example, the display apparatus of the HMI 30 in order to notify the driver that there is the movable lane on the left side (step S75). For example, when the host vehicle M travels in the right lane L3, the traveling control unit 170 displays the center lane L2 present on the left side of the right lane L3 in which the host vehicle M travels as a movable lane 37 in a colored (emphasized) manner as shown in the display apparatus 31 shown in FIG. 11. For example, "change the lane to the left lane based on the instruction" may be notified by voice from the speaker of the HMI 30.

Next, the traveling control unit 170 executes an intended automatic lane change to the lane on the left side of the host vehicle M in accordance with an intention of the driver (step S76). For example, when the host vehicle M travels in the right lane L3, the traveling control unit 170 executes the intended automatic lane change of the host vehicle M that moves from the right lane L3 to the center lane L2.

In step S74, when there is no lane on the left side of the lane in which the host vehicle M travels (step S74: No), the traveling control unit 170 continues traveling in the lane in which the host vehicle M currently travels, and ends the processing of the intended automatic lane change.

In this way, according to the vehicle control apparatus 100, the lane changes of the right lane change to the lane present on the right side and the left lane change to the lane present on the left side with respect to the lane in which the host vehicle M travels can be easily executed by a simple operation of the same content, for example, simply pressing the lane change button 86 once.

In the above embodiment, a case where the host vehicle M travels in the center lane L2 or the right lane L3 has been described, but for example, the same processing can be executed also in a case where the host vehicle M travels in the left lane L1. However, when the host vehicle M travels in the left lane L1, the traveling control unit 170 causes the host vehicle M to perform the intended automatic lane change from the left lane L1 to the center lane L2 by firstly pressing the lane change button 86, and causes the host vehicle M to perform the intended automatic lane change from the center lane L2 to the right lane L3 by secondly pressing the lane change button 86.

Examples of a situation in which the intended automatic lane change is executed include a case where there is an obstacle in front of the lane in which the host vehicle M travels, a case where a large vehicle travels in front of the lane, and a case where the number of traveling lanes changes in front of the lane.

Even when there is a lane on the right side of the host vehicle M, the traveling control unit 170 can also perform control such that the lane of the host vehicle M is automatically changed to the lane on the left side. In this case, for example, a reverse lane change button 87 may be provided on the steering wheel 82 separately from the lane change button 86 (see FIG. 6). When the reverse lane change button 87 is pressed by the driver, the traveling control unit 170 causes the host vehicle M to automatically change the lane to the lane on the left side even when there is a lane on the right side of the host vehicle M. Specifically, when the reverse lane change button 87 is pressed by the driver of the host vehicle M, the traveling control unit 170 causes the host vehicle M to automatically change the lane to the left lane L1 on the left side even when there is the right lane L3 on the right side of the host vehicle M. Instead of operating the reverse lane change button 87, when a turn lever is operated by using the existing turn lever, the lane of the host vehicle M may be automatically changed to the left lane L1 on the left side. Alternatively, instead of operating the reverse lane change button 87, when the lane change button 86 is pressed twice in succession by using the lane change button 86, the lane of the host vehicle M may be automatically changed to the left lane L1 on the left side.

Although the embodiment of the present invention has been described above, the present invention is not limited to the above embodiment, and modifications, improvements, and the like can be made as appropriate.

For example, in the above embodiment, the processings of the proposed automatic lane change (overtaking, yield) and the intended automatic lane change when the host vehicle M travels in the three-lane road have been described, but the present invention is not limited thereto. For example, the same processing can be executed also in a case where the host vehicle M travels on a road of two lanes or in a case where the host vehicle M travels on a road of four or more lanes.

In the above embodiment, a case has been described in which each of the "overtaking lane change" and the "return lane change", each of the "yield lane change" and the "return lane change", and each of the "right lane change" and the "left lane change" are executed by the operation of the same content of pressing the lane change button 86, but the present invention is not limited thereto. For example, when the lane change button 86 is pressed once, both lane changes of the "overtaking lane change" and the "return lane change", both lane changes of the "yield lane change" and the "return lane change", and both lane changes of the "right lane change" and the "left lane change" may be controlled to be executed as a series of lane changes.

In the above embodiment, control is performed such that the "overtaking lane change" and the "return lane change", the "yield lane change" and the "return lane change", and the "right lane change" and the "left lane change" are executed by the driver operating the lane change button 86, but the present invention is not limited thereto. For example, control may be performed such that the lane changes are executed by a voice input of the driver. In this case, control is performed such that each of the "overtaking lane change" and the "return lane change", each of the "yield lane change" and the "return lane change", and each of the "right lane change" and the "left lane change" are executed only by the driver pronouncing the same instruction voice of a "lane change".

In the above embodiment, the lane on the right side is described as the lane on an overtaking side (a side of a specific direction) and the lane on the left side is described as the lane on a yield side (a side opposite to the specific direction), but depending on a region where the host vehicle M travels, the lane on the left side is the lane on the overtaking side (the side of the specific direction) and the lane on the right side is the lane on the yield side (the side opposite to the specific direction).

The present specification describes at least the following matters. Although the corresponding components or the like in the above embodiment are shown in parentheses, the present invention is not limited thereto.

(1) A vehicle control apparatus including:

a recognition unit (the recognition unit 130) configured to recognize an environment in a vicinity of a vehicle (the host vehicle M); and a traveling control unit (the traveling control unit 170) configured to execute a lane change of the vehicle based on a recognition result by the recognition unit, in which the traveling control unit selectively executes a lane change of the vehicle based on proposal information of a lane change output to a driver of the vehicle by the traveling control unit and a lane change of the vehicle not based on the proposal information in response to a first operation (pressing the lane change button 86) of the same content by the driver.

According to (1), since the driver can perform the lane change based on the proposal from a vehicle control apparatus side and the lane change intended by the driver himself/herself without based on the proposal from the vehicle control apparatus side by the first operation of the same content, an operation in accordance with a type of the lane change becomes unnecessary, and the operation of the lane change can be facilitated.

(2) The vehicle control apparatus according to (1), in which the traveling control unit selectively executes, in response to the first operation, a first lane change (the overtaking lane change, the yield lane change) in which the vehicle is moved from a first lane (the center lane L2) to a second lane (the right lane L3, the left lane L1) based on the proposal information, a second lane change (the return lane change) in which the vehicle moved to the second lane by the first lane change is moved to the first lane, a third lane change (the intended automatic lane change) in which the vehicle is moved from the first lane (the center lane L2) to the second lane (the right lane L3, the left lane L1) without based on the proposal information, and a fourth lane change (the intended automatic lane change) in which the vehicle moved to the second lane by the third lane change is moved to the first lane.

In the vehicle control apparatus 100, the "first lane" means a lane in which the host vehicle M currently travels. The "second lane" means a lane on an overtaking side (for example, the right side) of the lane in which the host vehicle M currently travels. The "third lane" means a lane on a side (for example, the left side) opposite to the overtaking side of the lane in which the host vehicle M currently travels.

According to (2), since the driver can perform the first lane change for overtaking or the like based on the proposal from the vehicle control apparatus side, the second lane change of returning to the original lane after the first lane change, the third lane change for overtaking or the like intended by the driver himself/herself without based on the proposal from the vehicle control apparatus side, and the fourth lane change of returning to the original lane after the third lane change by the first operation of the same content, an operation in accordance with a type of the lane change or a direction of the lane change becomes unnecessary, and the operation of the lane change can be further facilitated.

(3) The vehicle control apparatus according to (2), in which in the lane change of the vehicle not based on the proposal information, the traveling control unit performs the third lane change in which the vehicle is moved to the second lane when the first operation is performed in a case where there is the second lane (the right lane L3) adjacent to a side in a specific direction (the right side) with respect to the first lane (the center lane L2), and performs the third lane change in which the vehicle is moved to a third lane (the left lane L1) adjacent to a side (the left side) opposite to the specific direction with respect to the first lane when the first operation is performed in a case where there is no second lane.

According to (3), when performing the lane change intended by the driver himself/herself without based on the proposal from the vehicle control apparatus side, the driver can automatically select a direction of the lane change in accordance with presence or absence of the left and right adjacent lanes of the lane in which the vehicle travels and perform the lane change by performing the first operation regardless of a direction of the lane change. For example, the driver can perform the lane change toward the overtaking lane and the lane change from the overtaking lane to the traveling lane by the first operation of the same content. Therefore, the operation of the lane change can be further facilitated. For example, it is assumed that a side in a specific direction is the right side and there are the left lane, the center lane, and the right lane. In this case, when the first operation is performed while the vehicle is in the left lane, the lane is changed from the left lane to the center lane. When the first operation is performed again in the state, the lane is changed from the center lane to the right lane.

(4) The vehicle control apparatus according to (3), in which the traveling control unit moves the vehicle to the third lane when a second operation (pressing the reverse lane change button 87) different from the first operation is performed in a case where there is the second lane.

According to (4), the driver can perform a lane change in a direction opposite to a direction of the lane change automatically selected during the first operation by performing the second operation. For example, the driver may perform the second operation when the driver wants to perform a lane change to a lane on a side opposite to the overtaking lane while traveling in the center lane among the three lanes. Accordingly, it is also possible to automatically select a direction of the lane change during the first operation, and to perform the lane change in a direction opposite to the direction of the lane change automatically selected during the first operation.

(5) The vehicle control apparatus according to any one of (2) to (4), in which in a case where there is a preceding vehicle (the other vehicle C1) of the vehicle in the first lane, the traveling control unit outputs the proposal information that proposes the first lane change (the overtaking lane change), and executes the first lane change when the first operation is performed after the proposal information that proposes the first lane change is output, and in a case where the vehicle overtakes the preceding vehicle on the second lane after the first lane change, the traveling control unit outputs proposal information that proposes the second lane change (the return lane change), and executes the second lane change when the first operation is performed after the proposal information that proposes the second lane change is output.

According to (5), when performing the lane change based on the proposal from the vehicle control apparatus side, the driver can perform the lane change by performing the first operation when approving the proposed lane change regardless of a direction of the lane change. For example, since the driver can perform the lane change toward the overtaking lane and the lane change from the overtaking lane to the traveling lane by the first operation of the same content, the operation of the lane change can be further facilitated.

(6) The vehicle control apparatus according to (5), in which when there is the preceding vehicle in the first lane and there is the second lane adjacent to a side in a specific direction with respect to the first lane, the traveling control unit outputs the proposal information that proposes the first lane change (the overtaking lane change) of moving the vehicle to the second lane, and in which when there is the preceding vehicle in the first lane and there is no second lane, the traveling control unit outputs the proposal information that proposes the first lane change (the overtaking lane change) of moving the vehicle to a third lane adjacent to a side opposite to the specific direction with respect to the first lane.

According to (6), when performing the lane change based on the proposal from the vehicle control apparatus side, the driver can automatically select a direction of the lane change in accordance with presence or absence of the left and right adjacent lanes of the lane in which the vehicle travels and perform the lane change by performing the first operation regardless of a direction of the lane change. For example, the driver can perform the lane change toward the overtaking lane and the lane change from the overtaking lane to the traveling lane by the first operation of the same content. Therefore, the operation of the lane change can be further facilitated.

(7) The vehicle control apparatus according to (6), in which when there is a following vehicle (the other vehicle C2) of the vehicle in the first lane, the traveling control unit outputs the proposal information that proposes the first lane change (the yield lane change) of moving the vehicle to the third lane.

According to (7), when there is the following vehicle, it is possible to propose to the driver the lane change to the lane on a side opposite to that in a case where there is the preceding vehicle. Also in this case, the driver can perform the lane change based on the proposal from the vehicle control apparatus side by performing the first operation.

(8) The vehicle control apparatus according to (7), in which when a distance between the vehicle and the following vehicle satisfies a predetermined condition, the traveling control unit outputs the proposal information that proposes the first lane change of moving the vehicle to the third lane.

According to (8), it is possible to propose to the driver the lane change in accordance with presence of the following vehicle and the distance between the vehicle and the following vehicle. For example, even when there is the following vehicle, when the distance between the vehicle and the following vehicle is sufficient (equal to or larger than a threshold), it is possible not to propose the lane change to the driver.

(9) The vehicle control apparatus according to any one of
(5) to (8), in which the traveling control unit maintains the vehicle in the first lane when the first operation is not performed within a predetermined time after the proposal information that proposes the first lane change (the overtaking lane change, the yield lane change) is output.

According to (9), when the driver does not approve the first lane change for overtaking or the like, it is possible to maintain the lane in accordance with an intention of the driver and continue following the preceding vehicle.

(10) The vehicle control apparatus according to any one of (5) to (9), in which when the first operation is not performed within a predetermined time after the proposal information that proposes the second lane change (the return lane change) is output, the traveling control unit outputs the proposal information that proposes the second lane change again.

According to (10), when the driver does not approve the second lane change of returning to the original lane after the first lane change is performed for overtaking or the like, the driver can be prompted to perform the second lane change of returning to the original lane again.

(11) The vehicle control apparatus according to any one of (1) to (10), further including:

a display unit (the display apparatus 31) configured to display a lane of a movement destination based on the lane change to the driver before the lane change.

According to (11), it is possible to easily notify the driver of a lane to which the vehicle moves by performing the first operation. Therefore, when the driver desires to change the lane to the displayed movement destination, the driver may perform the first operation, and the operation of the lane change can be further facilitated.

(12) The vehicle control apparatus according to any one of (1) to (11), in which the first operation is pressing a pressing button (the lane change button 86) provided on a steering apparatus (the steering wheel 82) of the vehicle.

According to (12), since the driver can perform the lane change by pressing the pressing button provided on the steering apparatus gripped during driving, the operation of the lane change can be further facilitated.

What is claimed is:

1. A vehicle control apparatus comprising:

at least one processor, wherein the at least one processor is configured to:

recognize an environment in a vicinity of a vehicle; and execute a lane change of the vehicle based on a recognition result, wherein the at least one processor is further configured to control an output of proposal information of a lane change of the vehicle to a driver of the vehicle, wherein the at least one processor is further configured to execute a lane change of the vehicle based on the output proposal information in response to a first operation in which the driver of the vehicle presses a button provided on a steering apparatus, wherein the at least one processor is further configured to execute a lane change of the vehicle not based on the output proposal information in response to the first operation, wherein in the lane change of the vehicle not based on the proposal information, the at least one processor is further configured to perform a lane change in which, when there is a first lane adjacent to a side in a specific direction with respect to a lane in which the vehicle travels, the vehicle is moved to the first lane, and perform a lane change in which the vehicle is moved to a second lane adjacent to a side opposite to the specific direction with respect to the lane in which the vehicle travels when the first operation is performed in a case where there is no first lane, and wherein the first lane is predetermined, and is prioritized over the second lane whenever the lane change of the vehicle not based on the proposal information is performed.

2. The vehicle control apparatus according to claim 1, wherein the at least one processor is further configured to selectively execute, in response to the first operation, a first lane change in which the vehicle is moved from a first lane to a second lane based on the proposal information, a second lane change in which the vehicle moved to the second lane by the first lane change is moved to the first lane, a third lane change in which the vehicle is moved from the first lane to the second lane without based on the proposal information, and a fourth lane change in which the vehicle moved to the second lane by the third lane change is moved to the first lane.

3. The vehicle control apparatus according to claim 2, wherein in the lane change of the vehicle not based on the proposal information, the at least one processor is further configured to perform the third lane change in which the vehicle is moved to the second lane when the first operation is performed in a case where there is the second lane adjacent to a side in a specific direction with respect to the first lane, and perform the third lane change in which the vehicle is moved to a third lane adjacent to a side opposite to the specific direction with respect to the first lane when the first operation is performed in a case where there is no second lane.

4. The vehicle control apparatus according to claim 3, wherein the at least one processor is further configured to move the vehicle to the third lane when a second operation different from the first operation is performed in a case where there is the second lane.

5. The vehicle control apparatus according to claim 2, wherein in a case where there is a preceding vehicle of the vehicle in the first lane, the at least one processor is further configured to control output of the proposal information that proposes the first lane change, and execute the first lane change when the first operation is performed after the proposal information that proposes the first lane change is output, and in a case where the vehicle overtakes the preceding vehicle on the second lane after the first lane change, the at least one processor is further configured to control output of proposal information that proposes the second lane change, and execute the second lane change when the first operation is performed after the proposal information that proposes the second lane change is output.

6. The vehicle control apparatus according to claim 5, wherein when there is the preceding vehicle in the first lane and there is the second lane adjacent to a side in a specific direction with respect to the first lane, the at least one processor is further configured to control output of the proposal information that proposes the first lane change of moving the vehicle to the second lane, and wherein when there is the preceding vehicle in the first lane and there is no second lane, the at least one processor is further configured to control output of the proposal information that proposes the first lane change of moving the vehicle to a third lane adjacent to a side opposite to the specific direction with respect to the first lane.

7. The vehicle control apparatus according to claim 6, wherein when there is a following vehicle of the vehicle in the first lane, the at least one processor is further configured to control output of the proposal information that proposes the first lane change of moving the vehicle to the third lane.

8. The vehicle control apparatus according to claim 7, wherein when a distance between the vehicle and the following vehicle satisfies a predetermined condition, the at least one processor is further configured to control output of the proposal information that proposes the first lane change of moving the vehicle to the third lane.

9. The vehicle control apparatus according to claim 5, wherein the at least one processor is further configured to maintain the vehicle in the first lane when the first operation is not performed within a predetermined time after the proposal information that proposes the first lane change is output.

10. The vehicle control apparatus according to claim 5, wherein when the first operation is not performed within a predetermined time after the proposal information that proposes the second lane change is output, the at least one processor is further configured to control output of the proposal information that proposes the second lane change again.

11. The vehicle control apparatus according to claim 1, further comprising:

a display configured to display a lane of a movement destination based on the lane change to the driver before the lane change.

* * * * *